United States Patent
Low

(10) Patent No.: US 11,418,728 B1
(45) Date of Patent: Aug. 16, 2022

(54) PROGRAMMABLE LIQUID CRYSTAL VIGNETTING ELEMENT WITH SELECTIVE SHADING FEATURE

(71) Applicant: Aptiv Technologies Limited, St. Michael (BB)

(72) Inventor: Yew-Kwang Low, Singapore (SG)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/173,366

(22) Filed: Feb. 11, 2021

(51) Int. Cl.
  *H04N 5/225* (2006.01)
  *H04N 5/238* (2006.01)
  *G03B 7/18* (2021.01)

(52) U.S. Cl.
  CPC .............. *H04N 5/238* (2013.01); *G03B 7/18* (2013.01)

(58) Field of Classification Search
  None
  See application file for complete search history.

(56) References Cited

U.S. PATENT DOCUMENTS

| | | | | |
|---|---|---|---|---|
| 2006/0164593 A1* | 7/2006 | Peyghambarian | ........ | G02F 1/29 349/200 |
| 2010/0053361 A1* | 3/2010 | Sugita | ................ | G02B 27/0075 348/222.1 |
| 2010/0053539 A1* | 3/2010 | Lin | ........................... | G02F 1/13 349/200 |
| 2010/0074077 A1* | 3/2010 | Katayama | ................ | G02B 3/14 369/53.12 |
| 2010/0110233 A1* | 5/2010 | Ohara | ................ | G02B 13/0055 348/240.3 |
| 2011/0128412 A1* | 6/2011 | Milnes | .................. | H04N 13/282 348/231.99 |
| 2011/0141341 A1* | 6/2011 | Lin | ........................ | G03B 13/36 348/345 |
| 2014/0028924 A1* | 1/2014 | Yamaguchi | .......... | G03B 17/565 349/1 |
| 2014/0049682 A1* | 2/2014 | Galstian | ............ | G02F 1/133784 348/356 |
| 2017/0359495 A1* | 12/2017 | Hawes | .................... | G03B 11/02 |
| 2018/0173078 A1* | 6/2018 | Clark | ........................ | G02F 1/29 |

* cited by examiner

*Primary Examiner* — Twyler L Haskins
*Assistant Examiner* — Dwight Alex C Tejano
(74) *Attorney, Agent, or Firm* — Nixon & Vanderhye P.C.

(57) ABSTRACT

An imaging system may comprise: a lens including one or more lens elements; a programmable liquid crystal light modulator disposed adjacent to the lens; an imaging sensor; and a processing system comprising at least one processor and memory. The processing system may be configured to control the imaging system to: capture an image through the lens using the imaging sensor; analyze the image to determine at least one characteristic of the lens; and based on the analysis of the image, control the programmable liquid crystal light modulator to set an effective aperture for the lens.

18 Claims, 7 Drawing Sheets

PROGRAMMABLE LIQUID CRYSTAL VIGNETTING ELEMENT WITH SELECTIVE SHADING FEATURE

FIELD OF THE INVENTION

Certain example embodiments of this invention relate to camera systems. More particularly, example non-limiting implementations relate to a camera system including a programmable liquid crystal light modulator (or other suitable controllable medium) that is controlled to modify an effective aperture for a lens and/or apply shading to an optical path of the imaging system.

BACKGROUND

Cameras have come a long way since the creation of the first digital camera in 1975 by Kodak Engineer Steve Sasson. Today digital cameras are found in many markets. One market that has seen a tremendous increase in use of digital cameras is the automotive industry.

Vehicles have rear-view cameras to provide a view behind the car when travelling in reverse, cameras on side-view mirrors to provide a view of blind spots, and on windshields to record accidents. In addition, cameras on vehicles are used to support semi-autonomous and autonomous driving. Autonomous vehicles rely on cameras on every side of the car to provide a 360-degree view of the vehicle's surroundings. To provide proper decisions based on analysis of images captured by the cameras, autonomous vehicle's cameras need to capture high quality images at a fast frame rate. Because high quality lenses are expensive low cost lenses are being used due to the large number of cameras in use. These low cost lenses need to pass stringent requirement for use in Advanced Driver Assistance Systems (ADAS).

Modulation transfer function (MTF) is a commonly used quantitative and objective measure for evaluating performance of components of an imaging system. MTF provides accurate and repeatable measurements. In some cases, MTF measurements from individual components (e.g., one or more lenses and/or a sensor) can be combined to provide an overall MTF measurement. When a lens or an imaging system does not satisfy certain MTF thresholds, they can be discarded or repurposed for other applications.

Some low cost lenses are made with vignetting feature to improve off axis MTF in order to pass stringent MTF requirement in ADAS cameras, without needing additional lens element to improve off axis MTF. However, known issues with vignetted camera lenses include random directional tilt and decenter caused by collective tolerances during assembly (which cause failure in post assembly MTF test at outer field angles) and/or random directional asymmetrical relative illumination and distortion issues.

SUMMARY

Exemplary embodiments of this disclosure provide systems and methods that can be used to improve operation of imaging systems. More specifically, exemplary embodiments of this disclosure provide an image system that includes a programmable liquid crystal (or other suitable controllable medium) light modulator that can be controlled to modify an effective aperture for a lens and/or to apply shading to an optical path of the imaging system.

According to one exemplary embodiment, an imaging system includes a programmable liquid crystal light modulator disposed adjacent to a lens to modify an effective aperture of the imaging system and selectively apply shading to an optical path of the imaging system based on determined characteristics of the lens and/or detecting features in an image captured by the imaging system. The detected features may include bright spots.

In another exemplary embodiment, an imaging system comprises: a lens including one or more lens elements; a programmable liquid crystal light modulator disposed adjacent to the lens; an imaging sensor; and a processing system comprising at least one processor and memory. The processing system is configured to control the imaging system to: capture an image through the lens using the imaging sensor; analyze the image to determine at least one characteristic of the lens; and based on the analysis of the image, control the programmable liquid crystal light modulator to set an effective aperture for the lens.

In another exemplary embodiment, the image is analyzed to determine a modulation transfer function (MTF) of the lens.

In another exemplary embodiment, the programmable liquid crystal light modulator is controlled to change a shape, a size and a position of the aperture based on the determined MTF of the lens.

In another exemplary embodiment, the programmable liquid crystal light modulator is disposed adjacent to a lens element of the lens.

In another exemplary embodiment, the lens includes a Plano-Concave Lens and the programmable liquid crystal light modulator bonded to a surface of the Plano-Concave Lens.

In another exemplary embodiment, the lens includes a Plano-Convex Lens and the programmable liquid crystal light modulator bonded to a surface of the Plano-Convex Lens.

In another exemplary embodiment, the lens includes a Meniscus Lens and the programmable liquid crystal light modulator bonded to a surface of the Meniscus Lens.

In another exemplary embodiment, the programmable liquid crystal light modulator is controlled to apply a shading to an optical path between the image sensor and at least one element of the lens.

In another exemplary embodiment, the lens comprises a fixed vignetting feature configured to improve off axis modulation transfer function (MTF) of the lens.

In another exemplary embodiment, an imaging system comprising: a lens including one or more lens elements; a programmable liquid crystal light modulator disposed adjacent to the lens; an imaging sensor; and a processing system comprising at least one processor and memory. The processing system is configured to control the imaging system to: capture an image through the lens using the imaging sensor; analyze the image to determine whether the image includes a bright spot exceeding a set threshold; and based on determining presence of the bright spot in the image, control the programmable liquid crystal light modulator to shade at least a portion of an optical path between the image sensor and at least one element of the lens.

In another exemplary embodiment, analyzing the image to determine whether the image includes the bright spot includes determining whether the bright spot is located within an inner or outer field of view (FOV) zone of the imaging system.

In another exemplary embodiment, the shading is applied to both the inner and the outer FOV zones based on the bright spot being determined to be within the inner FOV zone, and the shading is applied to angular positions of the optical path corresponding to the location of the bright spot, based on the bright spot being determined to be in the outer FOV zone.

In another exemplary embodiment, the shading is applied to the FOV zone based on the bright spot being determined to be within an outer FOV zone, and the shading is applied to angular positions of the optical path corresponding to the location of the bright spot, based on the bright spot being determined to be within the outer FOV zone.

In another exemplary embodiment, the shading is applied to the entire optical path based on the bright spot being determined to be within the inner FOV zone, and the shading is applied to a portion of the optical path in the outer FOV zone based on the bright spot being determined to be in the outer FOV zone.

In another exemplary embodiment, the analyzing the image and controlling the programmable liquid crystal light modulator are performed in real time and repeatedly for a plurality of images.

In another exemplary embodiment, the programmable liquid crystal light modulator is controllable to change shape, size and position of an effective aperture for the lens.

In another exemplary embodiment, the programmable liquid crystal light modulator is disposed adjacent to a lens element of the lens and between the imaging sensor and the lens element.

In another exemplary embodiment, the lens includes a Plano-Concave Lens and the programmable liquid crystal light modulator bonded to a surface of the Plano-Concave Lens, the lens includes a Plano-Convex Lens and the programmable liquid crystal light modulator bonded to a surface of the Plano-Convex Lens, or the lens includes a Meniscus Lens and the programmable liquid crystal light modulator bonded to a surface of the Meniscus Lens.

In another exemplary embodiment, the lens comprises a fixed vignetting feature configured to improve off axis modulation transfer function (MTF) of the lens.

In another exemplary embodiment, a computer implemented method comprises: controlling an imaging sensor to capture an image through a lens; analyzing the image to determine whether the image includes a bright spot exceeding a set threshold; and based on determining presence of the bright spot in the image, controlling a programmable liquid crystal light modulator disposed between the lens and the imaging sensor to shade at least a portion of an optical path between the image sensor and at least one element of the lens.

In another exemplary embodiment, analyzing the image to determine whether the image includes the bright spot includes determining whether the bright spot is located within the inner or outer field of view (FOV) zone of an imaging system including the lens and imaging sensor, the shading is applied to the entire optical path based on the bright spot being determined to be in the inner FOV zone, and the shading is applied to a portion of the optical path in the outer FOV zone based on the bright spot being determined to be in the outer FOV zone.

In another exemplary embodiment, the imaging system is coupled to an advanced driver assistance system and is configured to provide images to the advanced driver assistance system for autonomous driving decisions.

In another exemplary embodiment, a vehicle comprises an advanced driver assistance system and an imaging system coupled to the advanced driver assistance system and configured to capture images and transmit the images to the advanced driver assistance system for autonomous driving decisions, wherein the imaging system comprising: a lens including one or more lens elements; a programmable liquid crystal light modulator disposed adjacent to the lens; an imaging sensor; and a processing system comprising at least one processor and memory. The processing system is configured to control the imaging system to: capture an image through the lens using the imaging sensor; analyze the image to determine whether the image includes a bright spot exceeding a set threshold; and based on determining presence of the bright spot in the image, control the programmable liquid crystal light modulator to shade at least a portion of an optical path between the image sensor and at least one element of the lens.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Certain example embodiments of this application provide solution(s) that improve MTF measure of a lens by providing a programmable liquid crystal light modulator configurable to provide a variable vignetting feature, shape and/or position. Certain example embodiments of this application provide a programmable liquid crystal that is controlled to provide a variable shade for active glare reduction. The example embodiments provide post assembly MTF correction of a camera module that may have failed off axis MTF test, without requiring moving parts and that is low cost and compact, and/or provide a selective shading feature to counteract sun glare or other bright illumination in different direction.

Example embodiments can provide post lens assembly MTF correction of low cost lenses. Conventional approaches using vignetting feature to correct MTF in low cost lenses cause random decentering and tilt which cause MTF failure at outer field angles, and cause asymmetrical relative illumination. Issues introduced by the vignetting feature are irreversible once assembled, and are limited to a fixed aperture shape. Examples of the present technology address these and other issues by using a programmable liquid crystal to improve image off axis MTF by selectively reducing any problematic part of clear aperture within allowable tolerance, provide a variable clear aperture size, shape and position, and provide selective shade to mitigate glare from different directions.

Figure 1:
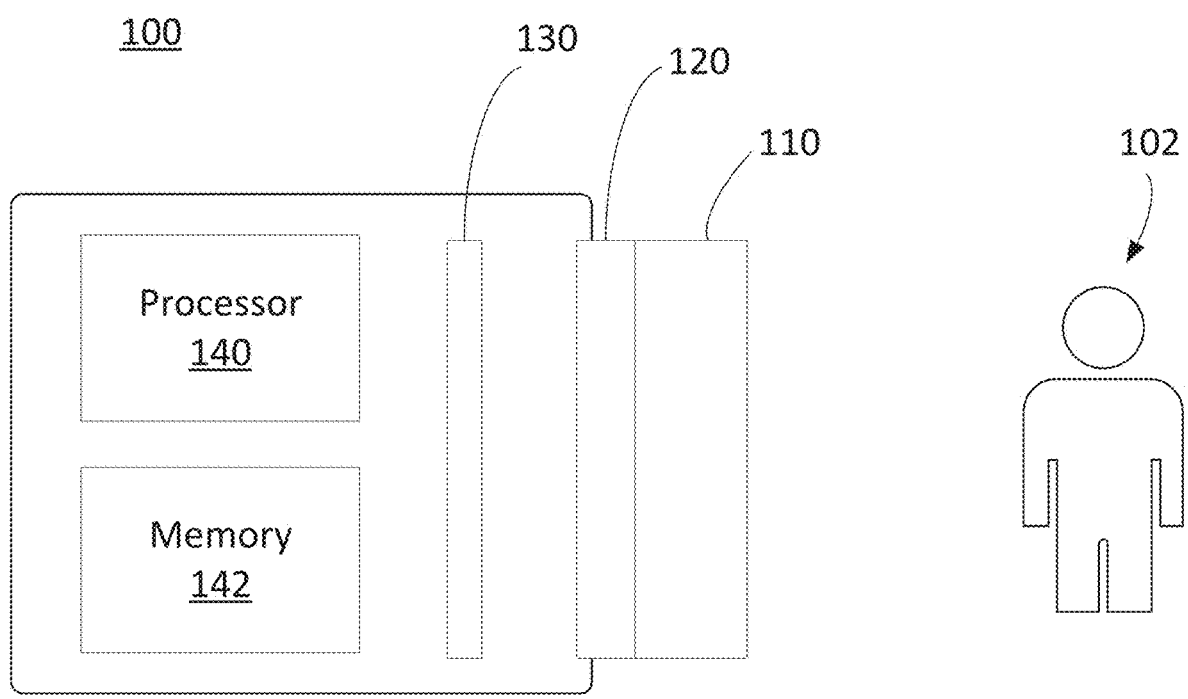
FIG. 1 illustrates an exemplary imaging system according to an embodiment of the present disclosure.

FIG. 1 illustrates an exemplary imaging system 100 according to an embodiment of the present disclosure. The imaging system 100 may be used to capture an image of a scene including one or more objects 102. The imaging system 100 may include a lens 110, a liquid crystal light modulator 120 and an imaging sensor 130. In some examples, the liquid crystal light modulator 120 may be replaced with or comprise a component configured to perform ray clipping (e.g., a smart marginal ray clipper). The imaging system 100 may include a processing system including a processor 140 and memory 142. While not illustrated in FIG. 1, the imaging system 100 may include other components such as input device(s), display(s), communication circuitry, etc.

As shown in FIG. 1, the liquid crystal light modulator 120 may be disposed between and in an imaging optical path of the imaging sensor 130 and the lens 110. The liquid crystal light modulator 120 may be provided adjacent to the lens 110. In some examples, the liquid crystal light modulator 120 may be provided directly adjacent to a surface of the lens or lens element facing the imaging sensor 130. The liquid crystal light modulator 120 may be provided as part of the lens assembly inside a common housing. The liquid crystal light modulator 120 may be provided at one end of a lens including a plurality of lens element or between different lens elements.

The lens 110 may include one or more lens elements. The lens 110 may be a standard lens, a telephone lens, a wide angle lens (e.g., a fisheye lens) or a macro lens. The lens 110 may have a fixed or variable focal length. The lens 110 may include one or more of Plano-Concave Lens (PCV), Plano-Convex Lens (PCX), and/or a Meniscus Lens. In one example, the lens 110 is a wide angle lens having a fixed focal length and/or aperture.

In some examples of the present technology the lens 110 may have optical vignetting problems, also known as "light fall-off". Vignetting is a reduction of an image's brightness or saturation near edges of the image as compared to a center of the image. Vignetting was originally used to refer to decorative designs on borders of a book. Photographs today use the term to refer to an effect in images that provides less clarity at edges of the image, which may be intentional or unintentional. Vignetting can be caused by characteristics of the lens and is particularly prominent in wide angle lenses, prime lenses and/or lenses having large apertures. In some cases Vignetting can also be caused by imaging system components external to the lens such as, filters, filter holders and/or lens hoods.

Optical vignetting can be caused by partial blocking of light by lens barrels. Optical vignetting can also be caused by rays away from an optical axis traveling longer, so by the time the rays reach the imaging sensor, more vignetting will show up in the image. This type of optical vignetting is especially noticeable on wide angle lenses.

Figure 2:
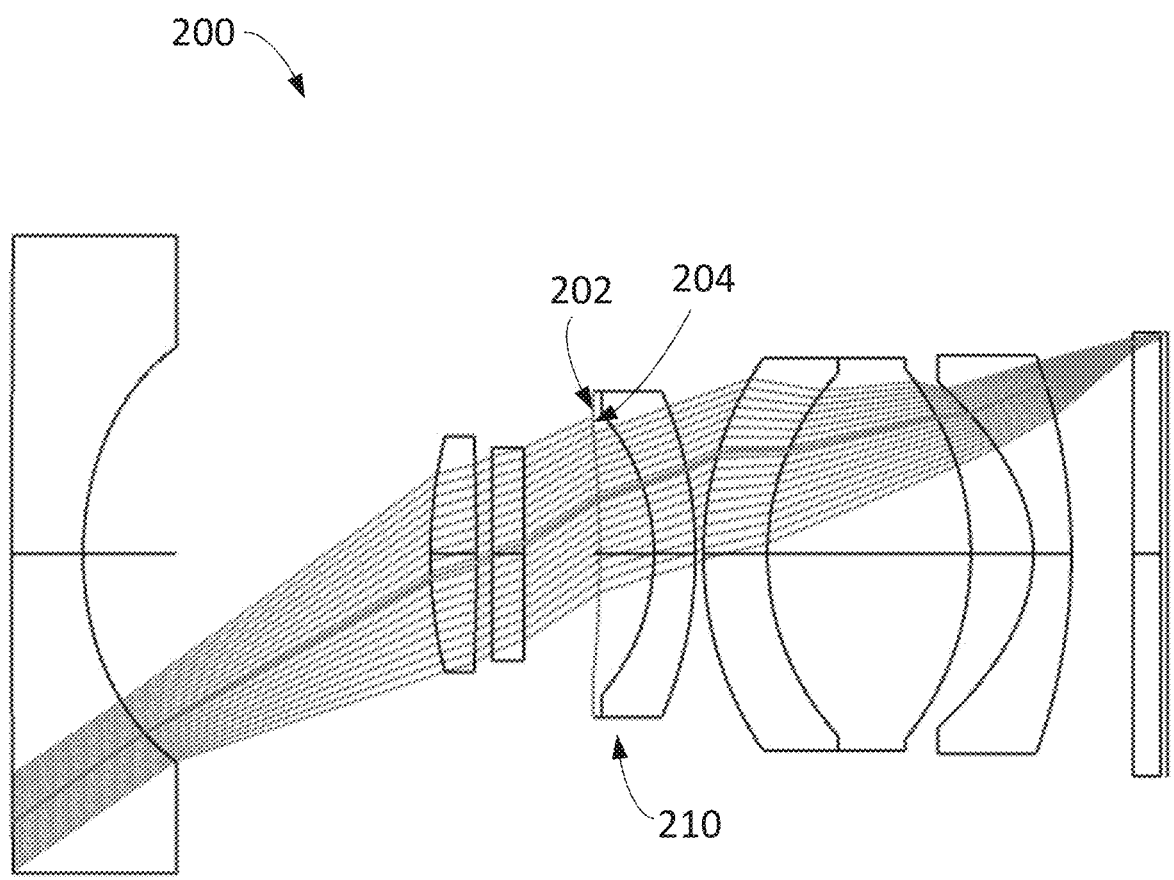
FIG. 2 illustrates an example of a lens assembly including lens elements providing a clear aperture and a vignetted aperture.

In some examples of the present technology, the lens 110 may include one or more apertures to block light outside of the clear apertures. The apertures may block on-axis rays and/or off-axis rays. In some example, the lens 110 may include a fixed vignetting aperture to remove some marginal rays to improve MTF. FIG. 2 illustrate an example of a lens assembly 200 including lens elements providing a clear aperture 202 and a vignetted aperture 204. As shown in FIG. 2, a portion of the lenses are blocked by aperture 210 to provide the clear aperture 202 and the vignetted aperture 204.

While the fixed vignetting aperture can remove some marginal rays to improve MTF, random decentering and tilt can cause MTF failure at outer field angles. In addition, the fixed vignetting aperture can cause asymmetrical relative illumination and distortion. These conditions can be detectable after assembly of the lens but they are irreversible after the lens is assembled. Examples of the present technology provide for systems and method to at least partially correct for at least these conditions and/or improve the MTF after the lens is assembled.

The liquid crystal light modulator 120 allows for spatial control of a phase and/or amplitude of light. The liquid crystal light modulator 120 may include a plurality of crystal cells arranged in one dimensional or two dimensional array, each cell individually controllable to control phase and/or amplitude of light. The liquid crystal light modulator 120 may comprise a liquid-crystal light valve (LCLV). Liquid-crystals in the LCLV may be provided between a glass plate and a crystal (e.g., bismuth silicon oxide) and server as a photoconductive medium. Application of a voltage (e.g., square-wave) to electrodes on the plate and the crystal can change the refractive index of the liquid crystal.

The LCLV may be programmed to control vignetting and/or provide selective shading. An LCLV controlling vignetting may be referred to as a Programmable Liquid Crystal Vignetting Element (LCVE). The LCVE can be programed to control an effective aperture of the lens. The LCVE can be programed to control aperture shape, size and/or position, provide different shades, and/or improve image off axis MTF by selectively reducing any problematic part of a clear aperture within allowable tolerance. In some example, the LCLV may have two modes of operation (e.g., opened and closed). In some examples, the LCVE may control the amount marginal ray clipping.

Because the LCLV may in some cases not provide desired transmission, this can be resolved by increasing integration time of the imaging sensor 130. For example, some LCLVs may allow for 45% transmission in open position when a very dark, up to 99% light blockage is required in the dark portion.

In some examples, the programmable LCVE is used instead of fixed vignetting element at one of the lens elements surface in lens module. In other examples, the programmable LCVE can be used together with a fixed vignetting element.

The programmable LCVE according to examples of the present technology provide a multifunctional system that allows for selective shading feature, programmable aperture shape, size and position and provide post assembly MTF improvement for camera.

Figure 3A:
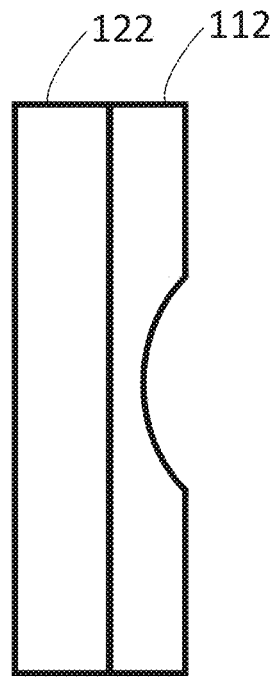
FIG. 3A illustrates Programmable Liquid Crystal Vignetting Element (LCLV) bonded to a surface of Plano-Concave Lens according to an embodiment of the present disclosure.
Figure 3B:
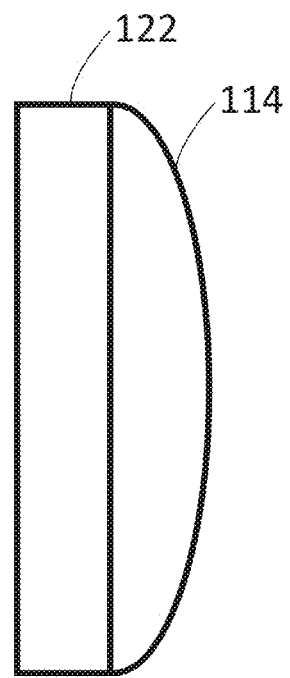
FIG. 3B illustrates an LCLV bonded to a surface of Plano-Convex Lens according to an embodiment of the present disclosure.
Figure 3C:
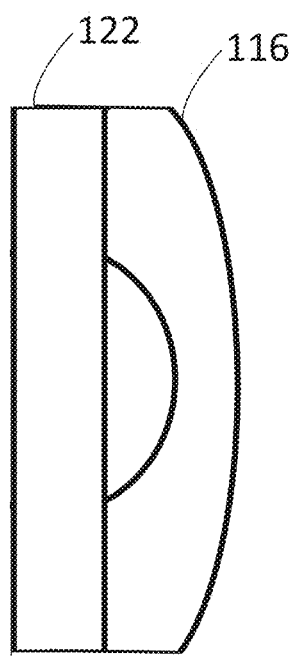
FIG. 3C illustrates an LCLV bonded to a surface of a Meniscus Lens according to an embodiment of the present disclosure.
Figure 3D:
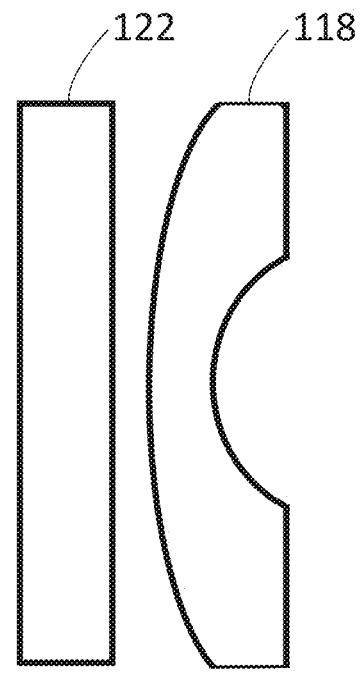
FIG. 3D illustrates an LCLV provided separate from a lens element according to an embodiment of the present disclosure.

FIGS. 3A-3D illustrate examples of an LCLV 122 provided with different types of lenses. FIG. 3A illustrates an LCLV 122 bonded to a surface of Plano-Concave Lens 112. FIG. 3B illustrates an LCLV 122 bonded to a surface of Plano-Convex Lens 114. FIG. 3C illustrates an LCLV 122 bonded to a surface of a Meniscus Lens 116. FIG. 3D illustrates an LCLV 122 provided separate from a lens element 118.

Figure 4A:
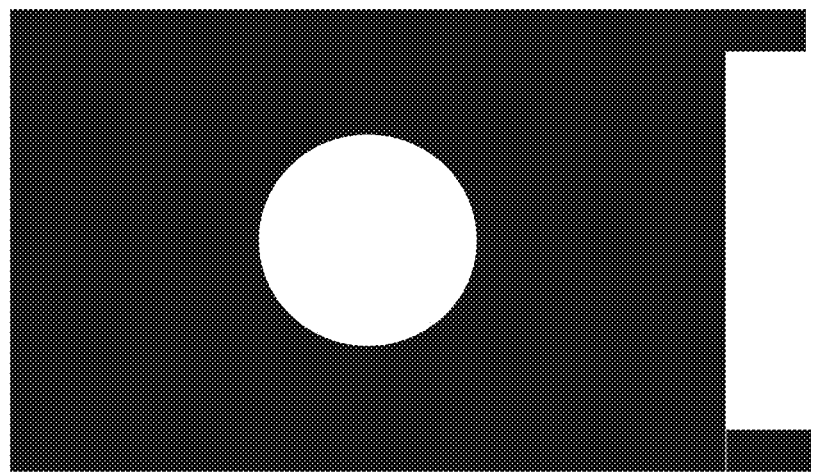
FIG. 4A illustrates an example of an LCLV being controlled to reduce the size of the aperture according to an embodiment of the present disclosure.
Figure 4B:
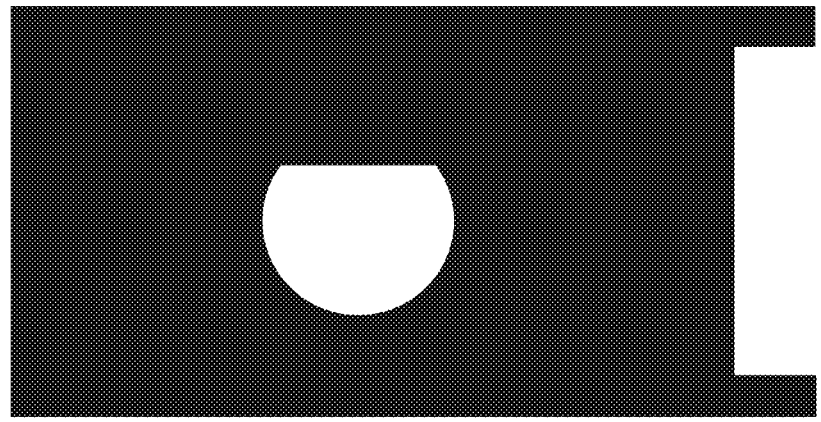
FIG. 4B illustrates an example of an LCLV being controlled to reduce the size of the aperture and to block an upper portion of the aperture according to an embodiment of the present disclosure.
Figure 4C:
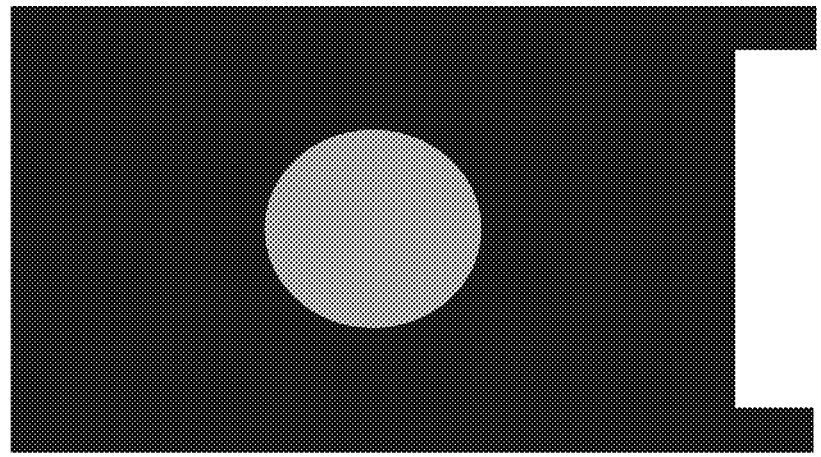
FIG. 4C illustrates an example of an LCLV being controlled to provide a reduced aperture with a shade according to an embodiment of the present disclosure.

FIGS. 4A-4C illustrate examples of an LCLV 122 programed to provide different apertures and/or shades according to examples of the present technology. FIG. 4A illustrates an example of an LCLV being controlled to reduce the size of the aperture. Portions of the LCLV 122 outside of the aperture are controlled to block transmission of light and portions of the LCLV 122 corresponding to the desired aperture are controlled to allow maximum transmission of light.

FIG. 4B illustrates an example of an LCLV being controlled to reduce the size of the aperture and to block an upper portion of the aperture. The upper portion of the aperture may be blocked to block bright spots detected in a portion of the image. FIG. 4C illustrates an example of an LCLV being controlled to provide a reduced aperture with a shade. The shade may be applied based on detecting bright spots in the central portion of the field of view of the lens.

Examples of the present technology are not limited to the different apertures and/or shades shown in FIG. 4A-4C. In some examples, the partial blocking of the aperture shown in FIG. 4B and shading shown in FIG. 4C may be applies simultaneously by controlling the LCLV. In some examples, the reduced aperture may be shifted vertically and/or horizontally to center the aperture on the optical center (e.g., determined based on calibration), which may be different from image sensor center and/or center of the lens assembly. In some examples, aperture having a shape that is different from a circle shown in FIG. 4A-4C may be provided by the LCLV.

Figure 5:
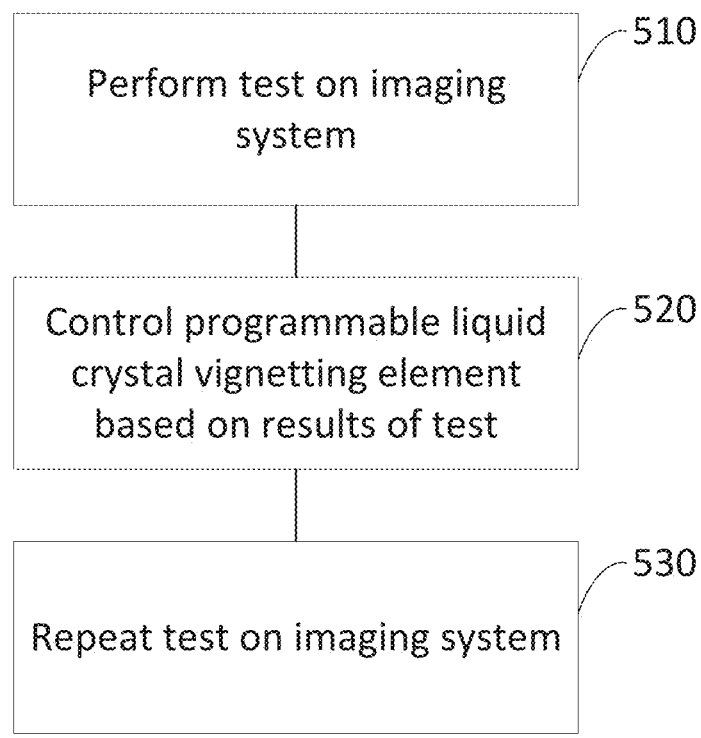
FIG. 5 shows a method for controlling an LCLV according to an embodiment of the present disclosure.

FIG. 5 shows a method for controlling an LCLV according to an example of the present technology. In some examples, a processing system including one or more processors and memory may be configured to control an imaging system to perform one or more operations of the method shown in FIG. 5. In some examples, a system, in which the imaging system is used, may include a processing system (e.g., a first processor and memory) that uses the images from the camera system to perform system operations (e.g., controlling an autonomous vehicle), while one or more of the operations shown in FIG. 5 are performed by a separate processing system (e.g., a second processor and memory) in parallel.

In operation 510, a test is performed on the imaging system to determine if performance of the imaging system satisfies predetermined requirements. The test may include testing one or more components of the imaging system. The test may include obtaining at least one characteristic of the lens. The test may include obtaining MTF measurement of one or multiple components of the imaging system. The test may include obtaining MTF measurements of a lens of the imaging system. Methods for measuring MTF may include discrete or continuous frequency generation, image scanning, and wavefront analysis, and/or a variation of one of these techniques.

In operation 520, the programmable crystal vignetting element is controlled based on the results of the test. If the test results of the test in operation 510 are satisfactory, the programmable crystal vignetting element may be omitted from the imaging system or previously applied setting of the programmable crystal vignetting element may be maintained. If the test results are not satisfactory, the programmable crystal vignetting element is controlled to provide different aperture and/or shades. Based on the test, the programmable crystal vignetting element may be controlled to set an effective aperture for the lens. The programmable crystal vignetting element may be controlled to set a smaller aperture to reduce distortion at edges of the lens. The programmable crystal vignetting element may be controlled to change a shape of and/or position of the aperture.

In operation 530, the test on the imaging system is repeated to determine if the performance of the imaging system satisfies predetermined requirements. If performance of the imaging system is not satisfactory, operation 520 may be repeated to change operation of the programmable crystal vignetting element.

In some examples, testing the imaging system may include performing analysis on images of a scene captured by an imaging sensor in real time. The images may be analyzed to determine distortions caused by the lens and/or bright spots in the image that need to be blocked or corrected (e.g., using shading). The scene may be captured (e.g., by a system installed on a vehicle), the image may be analyzed and the programmable crystal vignetting element may be adjusted based on the results of the analysis in real time. Thus, the system may be configured to adjust the imaging system to changes in the captured scene in real time. In some examples, the capturing, analyzing and controlling operations may be performed periodically (e.g., once every hour or 24 hours or monthly). In some examples, a predetermined condition such as a user command, starting a vehicle and/or detecting a vibration exceeding a predetermined threshold may trigger these operations.

Figure 6:
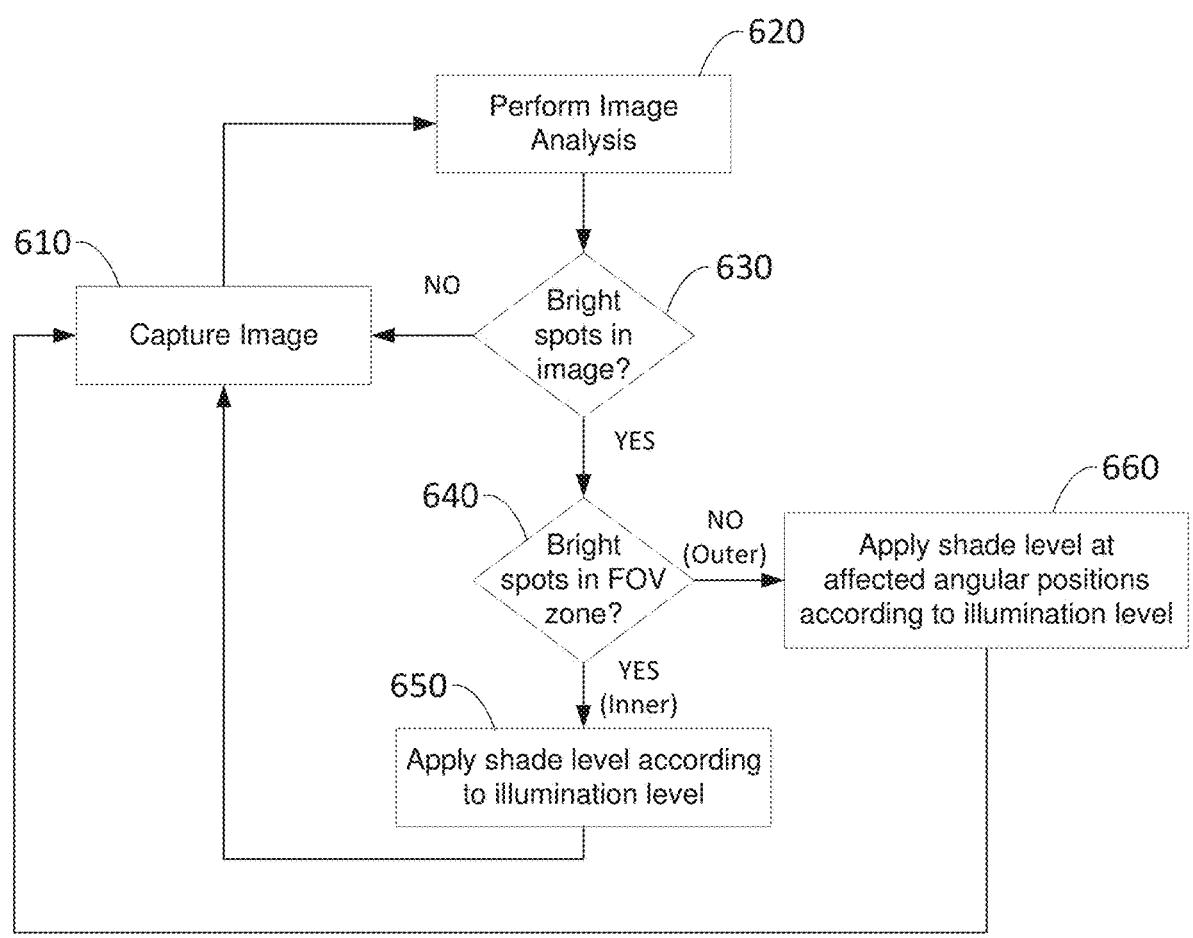
FIG. 6 shows another example of a method for controlling an LCLV according to an embodiment of the present disclosure.

FIG. 6 shows another example of a method for controlling an LCLV according to an example of the present technology. The method provides for selective shading feature to counteract glare issues in any given directions. In some examples, a processing system including one or more processors and memory may be configured to control an imaging system to perform one or more operations of the method shown in FIG. 6. The method shown in FIG. 6 may be performed in real time while the image system being tested and adjusted is used by the system in which it is installed (e.g., autonomous vehicle system). In some examples, a system, in which the imaging system is used, may include a processing system (e.g., a first processor and memory) that uses the images from the camera system to perform system operations (e.g., controlling an autonomous vehicle), while one or more of the operations shown in FIG. 6 are performed by a separate processing system (e.g., a second processor and memory) in parallel.

The method includes capturing an image by the imaging system (Step 610). The captured image may include a scene with one or more objects or one or more calibration patterns. The image may be captured in response to a user input, at predetermined intervals, or based on operation of the system (e.g., an autonomous vehicle system) in which the imaging system is installed. In some examples, the imaging system may capture a sequence of images for processing by the system using the imaging system and one of the image of the sequence may be used to perform operations shown in FIG. 6.

The captured image may be analyzed (Step 620) to determine if the image satisfies predetermined conditions. The predetermined condition may include whether the image includes one or more bright spots (Step 630). The bright spots may be caused by a glare (e.g., a sun glare) or other bright illumination. The bright spots may be determined by finding portions of the image having a predetermined number of pixels having a pixel values exceeding a threshold. The threshold may be pre-defined or determined based on the values of pixels in the image (e.g., an average value of all or some pixels). In some examples, the image may be filtered to remove the background and/or non-bright spots from the image as part of the analysis.

Bright spots that do not satisfy a predetermined size may be discarded. In some examples, the size and brightness of the bright spot may be considered to determine whether a bright spot will be discarded or not.

The analysis of the image may include determining the location, dimensions, shape and/or area of the bright spots. The location of the bright spot may be determined by determining a geometric center of the bright spot. In some examples, the radial coordinates based on the center of the image or imaging axis may be used to identify the location of the bright spot.

If there are no bright spots in the image satisfying the predetermined conditions (NO in step 630), a subsequent image may be captured (Step 610) and transmitted for analysis (Step 620).

If one or more bright spots in the image satisfying the predetermined conditions are detected (Yes in step 630), then a determination may be made as whether the bright spots are in the inner and/or outer Field of View (FOV) zone of the system. The outer FOV zone is defined by the effective FOV that could be affected by of the marginal ray clipping. The inner FOV zone is defined by the effective FOV not affected by the marginal ray clipping. The outer and/or inner FOV may depend on the location of the LCVE and the location with most overlapping ray bundles over the widest FOV range from the outer most FOV may be preferred. Information about the FOV zone may be pre-stored in the memory of the camera system.

If the bright spots are in the inner FOV zone (YES in Step 640), then a shade level according to the illumination level may be applied (Step 650). In some examples, the bright spot may be determined to be in the inner FOV zone if at least a portion of the bright spot is in the inner FOV zone or at least half of the bright spot is in the inner FOV zone.

The shade level may be applied to change a shading in at least a portion of an optical path in the outer FOV zone, such that the shade level changes at least the outer FOV zone of the image. In one example, the shade level of the LCLV can be applied such that the entire image is modified to reduce glare in the inner and outer FOV zones where the marginal clipping could not be effective in reducing glare in the inner FOV zone.

If the bright spots are not in the inner FOV zone (YES in Step 640), then a shade level at affected angular positions according to the illumination level may be applied (Step 660). The shade level may be applied to change a shading in at least a portion of an optical path in the outer FOV zone, such that the shade level changes a portion of the image corresponding to the angular positions affected by the bright spots. Because the bright spot is in the outer FOV zone, the LCLV can be controlled such that the inner FOV zone is not modified and the portion of the image the outer FOV zone is modified by the applied shade level.

After applying the shading level (Step 650 or Step 660), a subsequent image may be captured (Step 610) and transmitted for analysis (Step 620). Example of the present technology, allow for the LCLV to be controlled such that the shading levels and position of the shading by the LCLV can be updated in real time as the intensity, size and/or position of the bright spot changes.

In one example, if multiple bright spots are detected the LCLV may be controlled to apply shading based on the largest and/or brightest bright spot. In one example, if multiple bright spots are detected, the operations in FIG. 6 may be performed for one detected bright spot at a time, starting with the brightest bright spot. In this approach, a subsequent image may be captured and analyzed for the next bright spot.

In one example, if multiple bright spots are detected and at least one of the bright spots is in the FOV zone and at least one of the bright spots is outside of the FOV zone, then a shade level according to the illumination level may be applied (Step 650). In another example, if multiple bright spots are detected and at least one of the bright spots is in the inner FOV zone and at least one of the bright spots is in the outer FOV zone, then both Step 660 and Step 650 may be performed for each of the detected bright spots.

While the above example is described with reference to detecting bright spots in an image, the method shown in FIG. 6 may be applied to correct other predetermined conditions detected in the captured images. For example, the method shown in FIG. 6 may be detect various distortions (e.g., vignetting, pincushion diction, or barrel distortion) caused by one or more lens elements and apply shading by the LCLV to eliminate or reduce these distortions in the captured images.

In some examples of the present technology, the LCLV may be controlled to improve the MTF measurement by providing a vignetting aperture (e.g., see method described with reference to FIG. 5) and to adjust shading based on detecting bright spots (e.g., see method described with reference to FIG. 6).

While the examples of the present technology are described with reference to a vehicle, they are not so limited and may be applied to other camera systems installed in other locations and systems. For example, examples of the present technology may be applicable to cameras installed in aerial vehicles (e.g., drones, planes, autonomous planes), robots, inside or outside of buildings, walls, and traffic lights.

Figure 7:
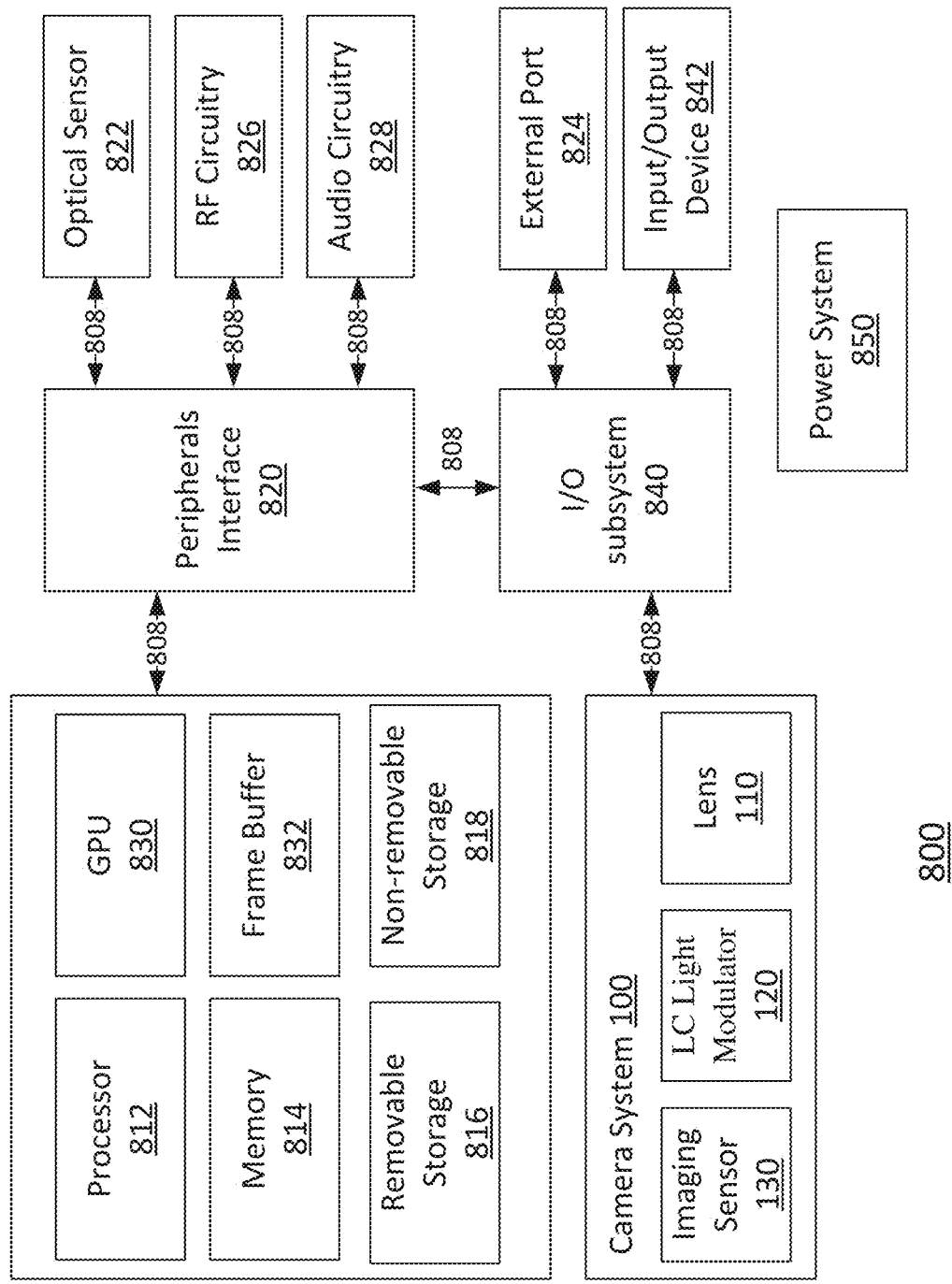
FIG. 7 illustrates an exemplary system upon which embodiments of the present disclosure(s) may be implemented.

FIG. 7 illustrates an exemplary system 800 upon which embodiments of the present disclosure(s) may be implemented. The system 800 may be included in a vehicle, but is not so limited. The system 800 may be a portable electronic device that is commonly housed, but is not so limited. The system 800 may include a camera system 100 comprising a lens 110, LC light modulator 120 and an imaging sensor. The various components in the system 800 may be coupled to each other and/or to a processing system by one or more communication buses or signal lines 808.

The camera system 100 may be coupled to a processing system including one or more processors 812 and memory 814. In some examples, the one or more processors 812 and memory 814 may correspond to the processor and memory shown in FIG. 1. The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 7, the processing system may communicate with other systems, components, or devices via peripherals interface 820. Peripherals interface 820 may communicate with an optical sensor 822, external port 824, RC circuitry 826, audio circuitry 828 and/or other devices. The optical sensor 882 may be a CMOS or CCD image sensor. The RC circuitry 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 812, etc.) of the processing system and/or components of other systems/devices. Additionally, the data may be accessed (e.g., by graphics processor 830) and displayed on an output device coupled to the processing system. Accordingly, memory 814, removable storage 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include, navigation applications, telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with selected content.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers. The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include an imaging sensor controller, a LC light Modulator controller and/or other input/output controller(s). The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

Embodiments of the subject matter and the functional operations described herein can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory storage medium for execution by, or to control the operation of, data processing apparatus (i.e., one or more computer programs). The computer storage medium can be one or more of: a machine-readable storage device, a machine-readable storage substrate, a random or serial access memory device, and combinations thereof.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this application.

The invention claimed is:

1. An imaging system comprising:
a lens including one or more lenses;
a programmable liquid crystal light modulator disposed proximate and/or adjacent to the lens;
an imaging sensor; and
a processing system comprising at least one processor and memory, the processing system configured to control the imaging system to:
capture an image through the lens via the imaging sensor;
analyze the image to determine at least one characteristic of the lens;
based on at least the analysis of the image, control the programmable liquid crystal light modulator to set an effective aperture for the lens; and
analyze the image to determine whether the image includes a bright spot exceeding a set threshold, including a determination whether the bright spot is located within an inner or outer field of view (FOV) zone of the imaging system, and based on determining presence of the bright spot in the image control the programmable liquid crystal light modulator to shade at least a portion of an optical path between the imaging sensor and at least part of the lens.

2. The imaging system of claim 1, wherein the image is analyzed to determine a modulation transfer function (MTF) of the lens.

3. The imaging system of claim 2, wherein the programmable liquid crystal light modulator is controlled to change a shape, a size and a position of the aperture based on the determined MTF of the lens.

4. The imaging system of claim 1, wherein the programmable liquid crystal light modulator is disposed adjacent to a lens element of the lens.

5. The imaging system of claim 1, wherein the lens includes a Plano-Concave Lens and the programmable liquid crystal light modulator bonded to a surface of the Plano-Concave Lens.

6. The imaging system of claim 1, wherein the lens includes a Plano-Convex Lens and the programmable liquid crystal light modulator bonded to a surface of the Plano-Convex Lens.

7. The imaging system of claim 1, wherein the lens includes a Meniscus Lens and the programmable liquid crystal light modulator bonded to a surface of the Meniscus Lens.

8. The imaging system of claim 1, wherein the programmable liquid crystal light modulator is controlled to apply a shading to an optical path between the image sensor and at least one element of the lens.

9. The imaging system of claim 1, wherein the lens comprises a fixed vignetting feature configured to improve off axis modulation transfer function (MTF) of the lens.

10. An imaging system comprising:
a lens including one or more lens elements;
a programmable liquid crystal light modulator disposed adjacent to the lens;
an imaging sensor; and
a processing system comprising at least one processor and memory, the processing system configured to control the imaging system to:
capture an image through the lens using the imaging sensor;
analyze the image to determine whether the image includes a bright spot exceeding a set threshold, including a determination whether the bright spot is located within an inner or outer field of view (FOV) zone of the imaging system; and
based on determining presence of the bright spot in the image, control the programmable liquid crystal light modulator to shade at least a portion of an optical path between the image sensor and at least one element of the lens.

11. The imaging system of claim 10, wherein the shading is applied to both the inner and the outer FOV zones based on the bright spot being determined to be within the inner FOV zone, and the shading is applied to angular positions of the optical path corresponding to the location of the bright spot, based on the bright spot being determined to be in the outer FOV zone.

12. The imaging system of claim 10, wherein the shading is applied to the entire optical path based on the bright spot being determined to be within the inner FOV zone, and the shading is applied to a portion of the optical path in the outer FOV zone based on the bright spot being determined to be in the outer FOV zone.

13. The imaging system of claim 10, wherein the analyzing the image and controlling the programmable liquid crystal light modulator are performed in real time and repeatedly for a plurality of images.

14. The imaging system of claim 10, wherein the programmable liquid crystal light modulator is controllable to change shape, size and position of an effective aperture for the lens.

15. The imaging system of claim 10, wherein the programmable liquid crystal light modulator is disposed adjacent to a lens element of the lens and between the imaging sensor and the lens element.

16. The imaging system of claim 10, wherein the lens includes a Plano-Concave Lens and the programmable liquid crystal light modulator bonded to a surface of the Plano-Concave Lens, the lens includes a Plano-Convex Lens and the programmable liquid crystal light modulator bonded to a surface of the Plano-Convex Lens, or the lens includes a Meniscus Lens and the programmable liquid crystal light modulator bonded to a surface of the Meniscus Lens.

17. The imaging system of claim 10, wherein the lens comprises a fixed vignetting feature configured to improve off axis modulation transfer function (MTF) of the lens.

18. A computer implemented method comprising:
controlling an imaging sensor to capture an image through a lens;
analyzing the image to determine whether the image includes a bright spot exceeding a set threshold; and
based on determining presence of the bright spot in the image, controlling a programmable liquid crystal light modulator disposed between the lens and the imaging sensor to shade at least a portion of an optical path between the image sensor and at least one element of the lens,
wherein analyzing the image to determine whether the image includes the bright spot includes determining whether the bright spot is located within an inner or outer field of view (FOV) zones of an imaging system including the lens and imaging sensor, the shading is applied to the entire optical path based on the bright spot being determined to be in the inner FOV zone, and the shading is applied to a portion of the optical path in the outer FOV zone based on the bright spot being determined to be in the outer FOV zone.

* * * * *